(12) United States Patent
Sudo et al.

(10) Patent No.: US 11,295,699 B2
(45) Date of Patent: Apr. 5, 2022

(54) DISPLAY DEVICE AND DISPLAY CONTROL METHOD

(71) Applicant: Mitsubishi Electric Corporation, Tokyo (JP)

(72) Inventors: Akitoshi Sudo, Tokyo (JP); Atsuhiko Nagamune, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/637,840

(22) PCT Filed: Sep. 1, 2017

(86) PCT No.: PCT/JP2017/031640
§ 371 (c)(1),
(2) Date: Feb. 10, 2020

(87) PCT Pub. No.: WO2019/043922
PCT Pub. Date: Mar. 7, 2019

(65) Prior Publication Data
US 2021/0151000 A1    May 20, 2021

(51) Int. Cl.
*G09G 5/00* (2006.01)
*B61L 15/00* (2006.01)
(Continued)

(52) U.S. Cl.
CPC ............ *G09G 5/006* (2013.01); *B61L 15/009* (2013.01); *B61L 15/0072* (2013.01);
(Continued)

(58) Field of Classification Search
CPC .. G09G 5/006; G09G 3/36; G09G 2340/0492; G09G 2380/10;
(Continued)

(56) References Cited

U.S. PATENT DOCUMENTS

2004/0263495 A1    12/2004  Sugino et al.
2009/0299550 A1    12/2009  Baker
(Continued)

FOREIGN PATENT DOCUMENTS

EP    3139129 A1    3/2017
JP    2005070810 A    3/2005

OTHER PUBLICATIONS

International Search Report (with English Translation) and Written Opinion issued in corresponding International Patent Application No. PCT/JP2017/031640, 8 pages (dated Dec. 5, 2017).
(Continued)

*Primary Examiner* — Abbas I Abdulselam
(74) *Attorney, Agent, or Firm* — Buchanan Ingersoll & Rooney PC

(57) ABSTRACT

A display device mounted on a train includes: a display capable of displaying display data by a plurality of display methods with different orientations; a detector that detects the installation state of the display; and a controller that acquires train information from which it is possible to determine whether the train is currently stopped, determines whether the train is currently stopped using the train information, determines a display method for the display data in the display on the basis of a result of detection performed by the detector when the train is currently stopped, and does not determine the display method in the display when the train is not currently stopped.

8 Claims, 5 Drawing Sheets

(51) Int. Cl.
*B61L 25/02* (2006.01)
*G09G 3/36* (2006.01)

(52) U.S. Cl.
CPC .............. *B61L 25/021* (2013.01); *G09G 3/36* (2013.01); *G09G 2340/0492* (2013.01); *G09G 2380/10* (2013.01)

(58) Field of Classification Search
CPC .. B61L 15/0072; B61L 15/009; B61L 25/021; G06F 3/1423
See application file for complete search history.

(56) References Cited

U.S. PATENT DOCUMENTS

| | | | |
|---|---|---|---|
| 2011/0235989 A1* | 9/2011 | Morimono | B61L 15/0036 386/230 |
| 2012/0154386 A1* | 6/2012 | Nagara | G06F 3/147 345/419 |
| 2014/0009498 A1 | 1/2014 | Bismilla | |
| 2017/0116964 A1* | 4/2017 | Needham | G06F 3/1423 |
| 2017/0278483 A1* | 9/2017 | Miyazawa | G09G 3/3611 |

OTHER PUBLICATIONS

Office Action dated Jul. 22, 2021, for corresponding Indian patent Application No. 202027004533, 6 pages.

* cited by examiner

DISPLAY DEVICE AND DISPLAY CONTROL METHOD

FIELD

The present invention relates to a display device mounted on a train and a display control method.

BACKGROUND

Conventionally, display devices mounted on a train show display data such as train operation guidance and advertisements to passengers. The display devices are installed beside the doors, above the doors, above the gangways, or the like in each car of the train. In the cars, cables are preferably provided for the display devices from the side faces including the upper faces and the lower faces, with the spaces in the depth direction of the portions in which the display devices are installed being taken into consideration. In a case where the display devices to be mounted on a train are of the same model, the display devices might need to be installed in varied directions in the cars, because of the cable arrangement from the cars. Therefore, the display devices are required to have a function to detect the installation state, and a function to change the directions in which the display data is displayed, depending on the installation state.

Patent Literature 1 discloses a technique by which a display device controls determination as to whether to display the display contents in the regular manner or upside down, on the basis of a result of detection performed by an upside-down sensor.

CITATION LIST

Patent Literature

Patent Literature 1: Japanese Patent Application Laid-open No. 2005-70810

SUMMARY

Technical Problem

However, according to the conventional technique described above, there was a case where the upside-down sensor wrongly determines, due to vibration or the like during movement, if the display devices mounted on a moving structure such as a train always reflect the results of detection performed by the upside-down sensor. Thus, there was a problem that the display devices show the passengers the display contents upside down, on the basis of the result of erroneous detection performed by the upside-down sensor.

The present invention has been made in view of the above, and aims to obtain a display device capable of reducing erroneous determination in determining the display orientation of display data.

Solution to Problem

To solve the above described problems and achieve the object a display device according to the present invention is mounted on a train. The display device includes: a display capable of displaying display data by a plurality of display methods with different orientations; a detector to detect an installation state of the display; and a controller to acquire train information from which it is possible to determine whether the train is currently stopped, and determine whether the train is currently stopped using the train information. When the train is currently stopped, the controller determines a display method for the display data in the display on the basis of a result of detection performed by the detector, and when the train is not currently stopped, the controller does not determine the display method in the display.

Advantageous Effects of Invention

According to the present invention, it is possible to reduce erroneous determinations in determining the display orientation of display data.

DESCRIPTION OF EMBODIMENTS

The following is a detailed description of a display device and a display control method according to an embodiment of the present invention, with reference to the drawings. Note that the present invention is not limited by this embodiment.

First Embodiment

Figure 1:
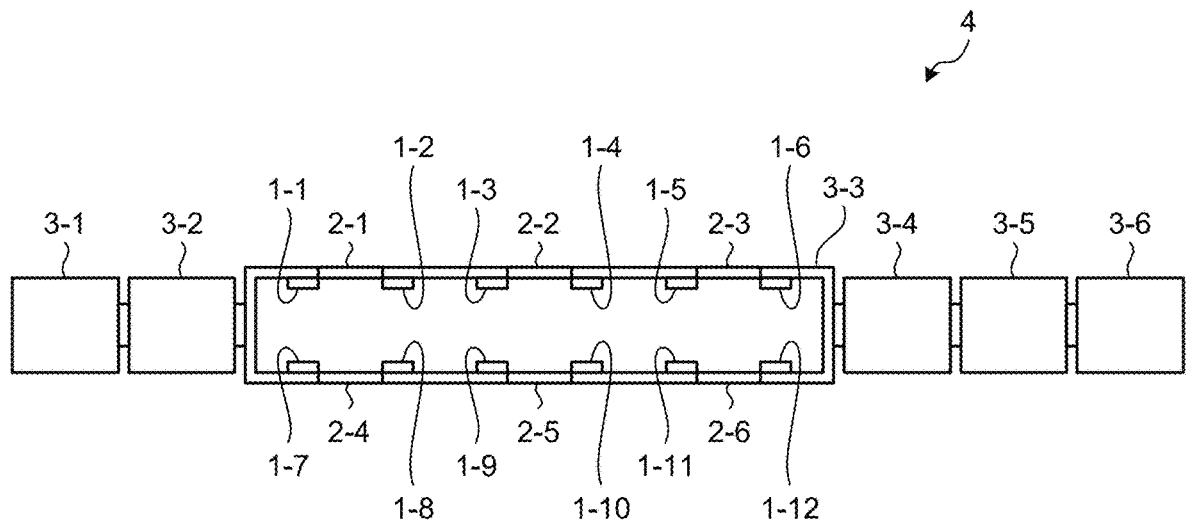
FIG. 1 is a diagram illustrating an example configuration of a train on which display devices according to a first embodiment are mounted.

FIG. 1 is a diagram illustrating an example configuration of a train 4 on which display devices 1-1 through 1-12 according to a first embodiment of the present invention are mounted. FIG. 1 illustrates the train 4 as viewed from above. In FIG. 1, for the sake of simplicity, only a car 3-3 among cars 3-1 through 3-6 constituting the train 4 is equipped with the display devices 1-1 through 1-12 and doors 2-1 through 2-6. However, the other cars 3-1, 3-2, and 3-4 through 3-6 have the same configuration as the car 3-3. In the description below, the display devices 1-1 through 1-12 may be referred to as the display device(s) 1 when not distinguished from one another, the doors 2-1 through 2-6 may be referred to as the door(s) 2 when not distinguished from one another, and the cars 3-1 through 3-6 may be referred to as the car(s) 3 when not distinguished from one another. In the train 4 illustrated in FIG. 1, the number of the cars 3, the number of the display devices 1, and the number of the doors 2 are examples, and are not limited to these numbers.

In the example illustrated in FIG. 1, the display devices 1 are installed beside each of the doors 2 of the car 3, which means that the display devices 1 are installed on the right and left sides of each door 2. In a case where the display devices 1 are installed beside the doors 2, a wide wiring space cannot be kept on the back side of each display device 1, because there is a door pocket for the door 2 on the back side of each display device 1 in the car 3. Therefore, cables are connected to side faces of the display devices 1, so that wiring spaces can be kept in the car 3. Note that, in the description below, the side faces of the display devices 1 are the left faces or the right faces of the display devices 1, for example. However, the upper faces or the lower faces may be used instead.

Figure 2:
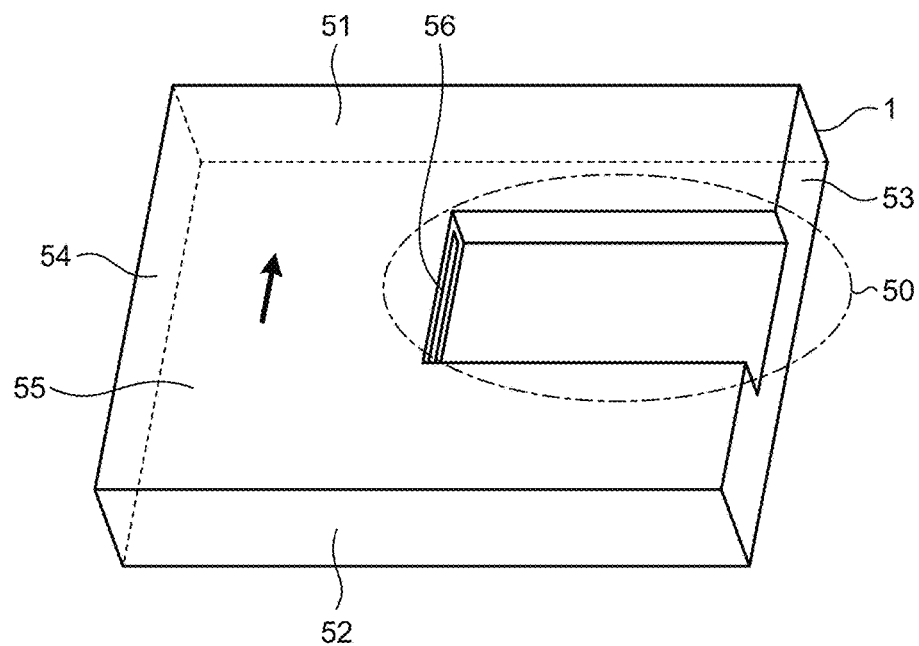
FIG. 2 is a schematic diagram illustrating an exemplary shape of the rear face of a display device according to the first embodiment.

FIG. 2 is a schematic diagram illustrating an exemplary shape of the rear face of the display device 1 according to the first embodiment. In FIG. 2, when a face 51 is on the upper side while a face 52 is on the lower side, the display device 1 is oriented in a prescribed direction. The prescribed direction is the direction in which the display device 1 is oriented with the top and the bottom thereof on the correct sides. In a case where the arrow illustrated in FIG. 2 is in an upward direction, the display device 1 is oriented in the direction in which the vertical direction is the prescribed direction. In the display device 1 in this case, a face 53 is the left face, a face 54 is the right face, and a face 55 is the rear face. Note that, in the display device 1, the face that is not illustrated in the drawing and is located on the opposite side from the face 55 is the front face, which is the display face. In the display device 1 illustrated in FIG. 2, a recess 50 is formed in the face 55, which is the rear face of the display device 1, with the size of the cable-side connector for connecting a cable from the car 3 being taken into consideration. A receiving-side connector 56 is disposed in the recess 50. However, the shape of the rear face of the display device 1 illustrated in FIG. 2 is an example, and the shape of the rear face is not limited to the example illustrated in FIG. 2. In a case where a cable wiring space can be secured in the car 3, the recess 50 is not formed in the display device 1, and the connector 56 may be provided on the face 53 or the like. As illustrated in FIG. 2, in the display device 1, the cable wiring direction from the car 3 is limited to one direction, which is on the side of the face 53.

Figure 3:
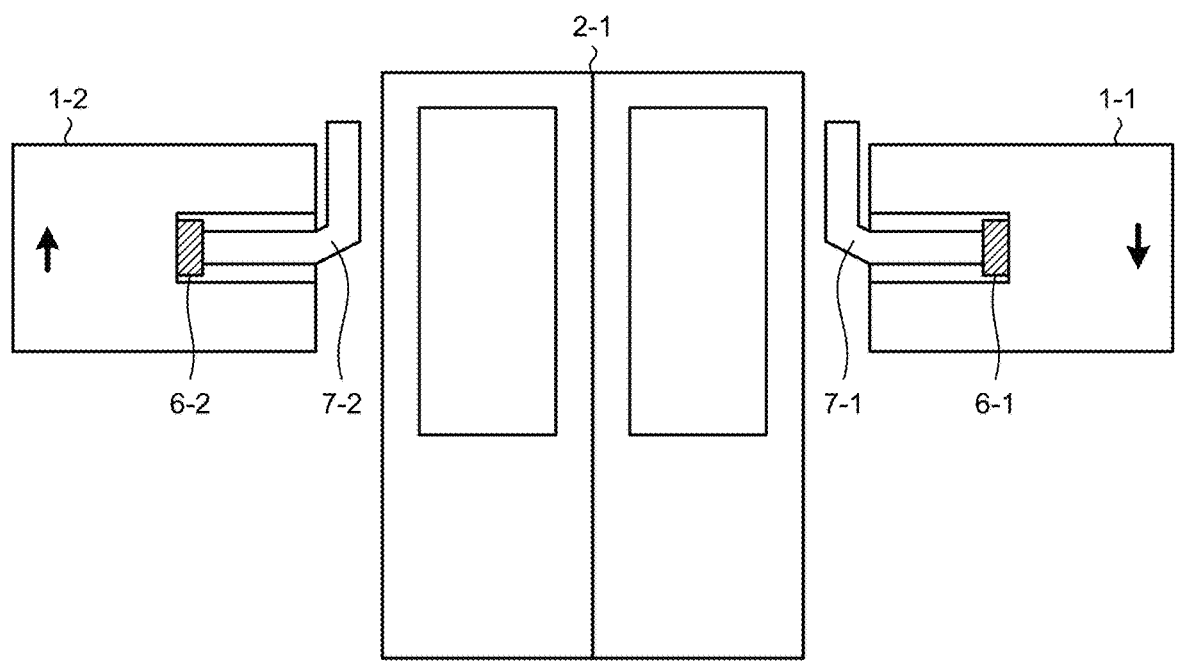
FIG. 3 is a schematic diagram illustrating an example arrangement of display devices according to the first embodiment in a car.

FIG. 3 is a schematic diagram illustrating an exemplary arrangement of display devices 1 according to the first embodiment in a car 3. FIG. 3 illustrates the door 2-1 and the display devices 1-1 and 1-2 in the car 3-3 of the train 4 illustrated in FIG. 1, as viewed from the outside of the car 3-3. Note that, in FIG. 3, the door 2-1, the display devices 1-1 and 1-2, a connector 6-1 and a cable 7-1 connected to the display device 1-1, and a connector 6-2 and a cable 7-2 connected to the display device 1-2 are illustrated, but the exterior of the car 3-3 and the like are not illustrated. In the description below, the connectors 6-1 and 6-2 may be referred to as the connector(s) 6 when not distinguished from each other, and the cables 7-1 and 7-2 may be referred to as the cable(s) 7 when not distinguished from each other.

In a case where the spaces for the cables 7 are secured in the vicinities of the door 2 as illustrated in FIG. 3, the installer of the display devices 1 to be installed on the right and left of the door 2 installs one of the display devices 1 with the top and the bottom thereof being oriented in the prescribed direction, and installs the other one of the display devices 1 with the top and the bottom thereof being oriented in the reverse direction of the prescribed direction. The reverse direction of the prescribed direction in which the top and the bottom of the display device 1 are oriented is the direction in which the display device 1 is rotated 180 degrees rightward or leftward with respect to the prescribed direction. By doing so, the installer of the display devices 1 can use display devices 1 of the same model as the display devices 1 to be installed on the right and left sides of the door 2, and can prevent an increase in the number of the models of display devices 1. As indicated by the arrows on the rear faces of the display devices 1, FIG. 3 illustrates an example in which the display device 1-2 is oriented in the prescribed direction, and the display device 1-1 is oriented upside down with respect to the prescribed direction. In the train 4 in this example, display data needs to be displayed on the display device 1 oriented in the prescribed direction, while display data needs to be displayed on the other display device 1 oriented upside down. The display data may be train operation guidance, an advertisement, or the like, for example. The direction in which the display data is turned upside down is the direction in which the display data is rotated 180 degrees rightward or leftward.

Figure 4:
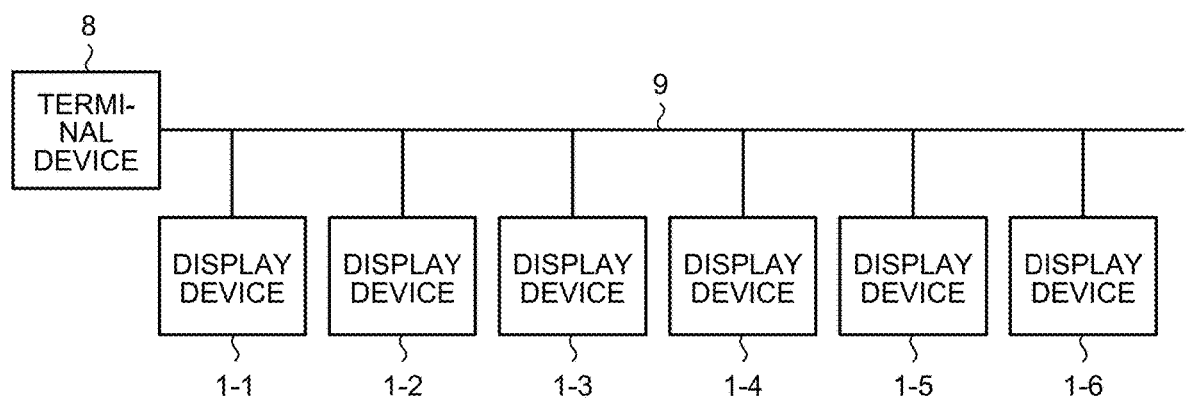
FIG. 4 is a diagram illustrating a part of the wiring lines of the display devices according to the first embodiment in a car.

FIG. 4 is a diagram illustrating a part of the wiring lines of the display devices 1 according to the first embodiment in a car 3. The display device 1 is connected to a terminal device 8 mounted on each car 3 via a control network line 9. The control network line 9 is included in the cables 7. The display devices 1 acquire, from the terminal device 8, the display data to be displayed on the display devices 1, and train information from which it is possible to determine that the train 4 is running or is currently stopped. The control network line 9 is a network wiring line according to Ethernet (registered trademark), but is not limited to this network wiring line. The terminal device 8 acquires the display data and the train information from a train information management system mounted on the train 4, and transmits the display data and the train information to each display device 1 via the control network line 9. The train information management system is a Train Information Management System (TIMS), for example. Note that the terminal device 8 may acquire the display data and the train information from a system other than the train information management system. Further, the display devices 1 may acquire the display data and the train information from the train information management system, without the use of the terminal device 8.

Figure 5:
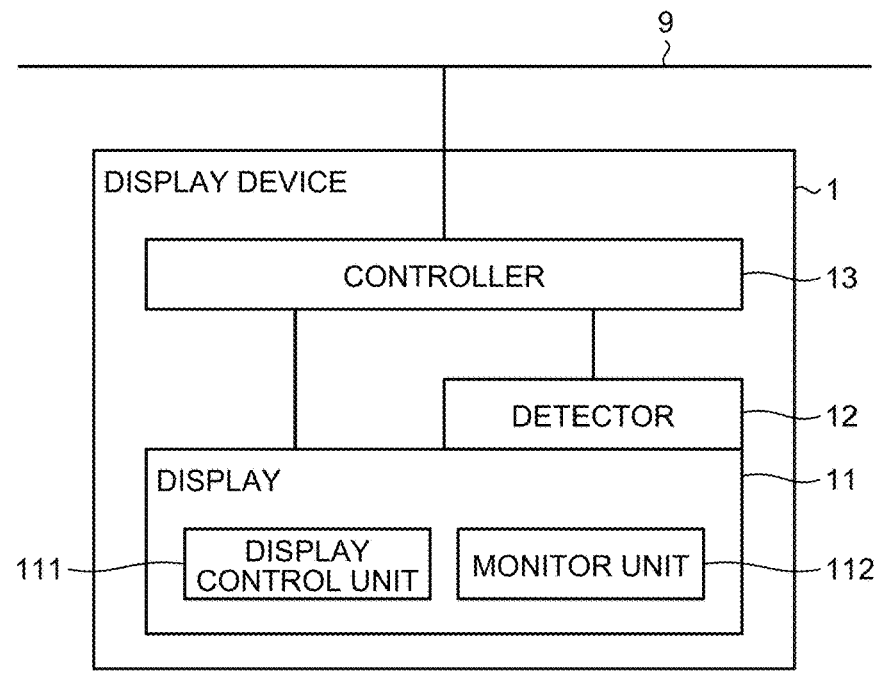
FIG. 5 is a block diagram illustrating an example configuration of the display device according to the first embodiment.

The configuration and the operation of the display device 1 that determines a display method of the display data will be described in detail. FIG. 5 is a block diagram illustrating an exemplary configuration of the display device 1 according to the first embodiment. The display device 1 includes a display 11, a detector 12, and a controller 13.

The display 11 displays display data by a plurality of display methods having different rotation angles for images of the display data, which are different orientations of images of the display data. Specifically, the display 11 can display the display data in a prescribed direction, and can display the display data in an upside-down direction. The display 11 includes a display control unit 111 and a monitor unit 112. The display control unit 111 causes the monitor unit 112 to display the display data according to a display method determined by the controller 13. The monitor unit 112 displays display data under the control of the display control unit 111.

The detector 12 detects the installation state of the display 11. Specifically, the detector 12 detects the installation state of the display 11 in the vertical direction, namely the detector 12 detects whether the display 11 is installed in a prescribed direction or is installed upside down. The detector 12 is a gyro sensor, for example.

The controller 13 acquires train information from the terminal device 8, and acquires a result of detection about the installation state of the display 11 from the detector 12. Using the train information, the controller 13 determines whether the train 4 is currently stopped. In a case where the train 4 is currently stopped, the controller 13 determines a display method of the display data in the display 11, on the basis of the result of detection performed by the detector 12. In a case where the train 4 is not currently stopped, or where the train 4 is running, the controller 13 does not determine the display method of the display data in the display 11. Specifically, in a case where the train 4 is currently stopped, and the detection result indicates that the display 11 is installed with the top and the bottom thereof being oriented in the prescribed direction, the controller 13 determines a display method for causing the display 11 to display the display data in the prescribed direction. Further, in a case where the train 4 is currently stopped, and the detection result indicates that the display 11 is installed with the top and the bottom thereof being oriented upside down with respect to the prescribed direction, the controller 13 determines a display method for causing the display 11 to display the display data upside down with respect to the prescribed direction. In a case where the controller 13 has determined a display method of the display data in the display 11, the controller 13 maintains, during the operation of the train 4, the display method of the display data determined for the display 11 while the train 4 was stopped.

Note that the display device 1 may not be of an integrated type, and may have a configuration in which the display 11, the detector 12, and the controller 13 are housed in different housings and are independent of one another. The detector 12 may be installed at the same location as the display 11, and may be installed at a different location from the controller 13. Accordingly, the detector 12 does not detect the installation state of the entire display device 1, but detects the installation state of the display 11.

Figure 6:
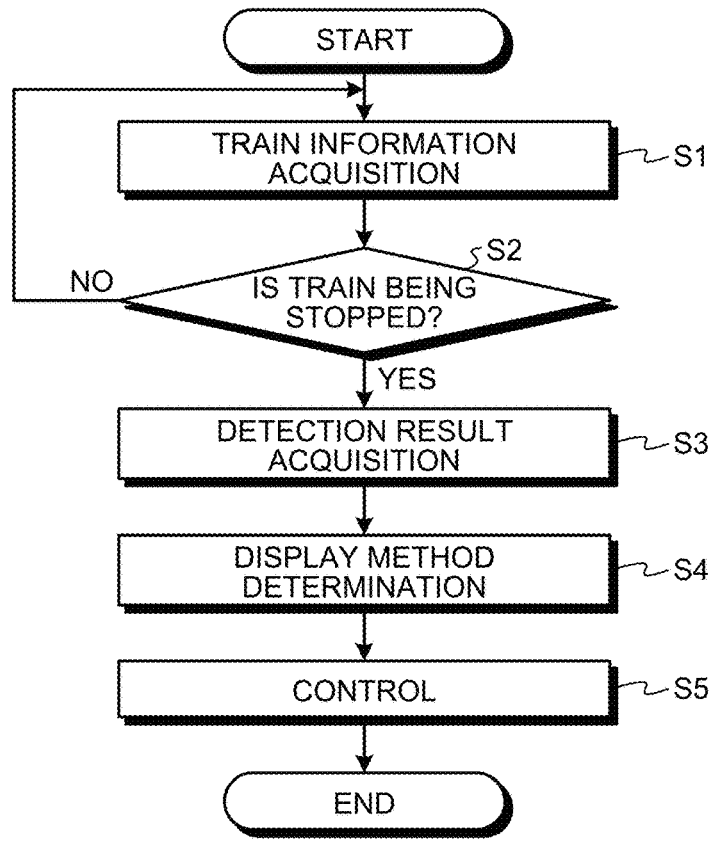
FIG. 6 is a flowchart illustrating an operation for determining a display method in the display device according to the first embodiment.

Next, the display control method of the controller 13, or an operation to be performed by the controller 13 to determine the display method in the display 11 in the display device 1 will be described. FIG. 6 is a flowchart illustrating an operation for determining a display method in the display device 1 according to the first embodiment.

First, the controller 13 acquires, from the terminal device 8 via the control network line 9, train information from which it is possible to determine that the train 4 is running or is currently stopped, or whether the train 4 is currently stopped (step S1). The train information from which it is possible to determine whether the train 4 is currently stopped is open/close information about the doors 2 in the train 4, positional information about the train 4, and velocity information about the train 4, for example. The train information may be only required to include at least one of these pieces of information, and may include a plurality of pieces of information.

On the basis of the acquired train information, the controller 13 determines whether the train 4 is currently stopped (step S2). In a case where the open/close information about the door 2 is information indicating that the doors 2 are open, the controller 13 can determine that the train 4 is currently stopped. Further, in a case where the positional information about the train 4 indicates that the position of the train 4 is the position of a station, the controller 13 can determine that the train 4 is currently stopped. Furthermore, in a case where the velocity information about the train 4 indicates that the velocity of the train 4 is "0", the controller 13 can determine that the train 4 is currently stopped.

If the train 4 is not currently stopped (step S2: No), which means that the train 4 is running, the controller 13 returns to step S1, and acquires the train information.

If the train 4 is currently stopped (step S2: Yes), the controller 13 acquires a result of detection of the installation state of the display 11 from the detector (step S3). In a case where the train 4 is running, there is a possibility that the detector 12 is not able to correctly detect or may wrongly detect the installation state of the display 11 due to vibration generated by the running of the train 4. Therefore, the controller 13 employs a result of detection performed by the detector 12 while the train 4 is stopped, and does not employ a result of detection performed by the detector 12 while the train 4 is running. Note that, in the display device 1, the detector 12 may always output a detection result, and the controller 13 may use the detection result in a case where the train 4 is currently stopped, or the controller 13 may read the detection result from the detector 12 in a case where the train 4 is currently stopped.

On the basis of the detection result acquired from the detector 12, the controller 13 determines a display method of the display data in the display 11 (step S4). Specifically, in a case where the detection result indicates that the display 11 is installed with the top and the bottom thereof being oriented in the prescribed direction, the controller 13 determines a display method for causing the display 11 to display the display data in the prescribed direction. Further, in a case where the detection result indicates that the display 11 is installed with the top and the bottom thereof being oriented upside down with respect to the prescribed direction, the controller 13 determines a display method for causing the display 11 to display the display data upside down with respect to the prescribed direction.

The controller 13 controls the display 11 to display the display data by the determined display method (step S5). In the display 11, the display control unit 111 causes the monitor unit 112 to display the display data in the prescribed direction or the upside-down direction, according to the display method determined by the controller 13.

The display device 1 performs the operation illustrated in the flowchart in FIG. 6 once after activation of the display device 1. In other words, in the display device 1, the controller 13 determines a display method in the display 11 once after the activation of the display device 1. Specifically, when the display device 1 is activated as the operation of the train 4 is started, the controller 13 performs the operation illustrated in the flowchart in FIG. 6. Since the train 4 is normally stopped at the time when the train 4 starts operating, the controller 13 performs the operation illustrated in the flowchart in FIG. 6 immediately after the start of the operation of the train 4. In the display device 1, the display method determined for the display 11 by the controller 13 is maintained until the train 4 finishes the operation. In the display device 1, the processing load of the controller 13 can be reduced by limiting the operation to be performed by the controller 13 to determine a display method in the display 11 to only one time.

Note that, in a case where the display device 1 is restarted due to a malfunction or the like during an operation of the train 4, the operation illustrated in the flowchart in FIG. 6 is performed again. In this case, the controller 13 does not determine a display method in the display 11 while the train 4 is running, and determines a display method in the display 11 after the train 4 stops. Thus, even in a case where the display device 1 is restarted, erroneous determination when the controller 13 determines a display method in the display 11 can be reduced.

Further, in the first embodiment described above, the display 11 can display the display data in the prescribed direction or the upside-down direction. However, the present invention is not limited to this. The display 11 may display the display data rotated 90 degrees rightward or leftward. In this case, the detector 12 is a sensor capable of detecting that the installation state of the display 11 is a state in which the display 11 has been rotated 90 degrees rightward or leftward. In a case where a result of detection performed by the detector 12 indicates that the installation state of the display 11 is a state in which the display 11 has been rotated 90 degrees leftward, the controller 13 determines to cause the display to display the display data rotated 90 degrees rightward, while the train 4 remains stopped. Further, in a case where a result of detection performed by the detector 12 indicates that the installation state of the display 11 is a state in which the display 11 has been rotated 90 degrees rightward, the controller 13 determines to cause the display to display the display data rotated 90 degrees leftward, while the train 4 remains stopped.

Next, the hardware configuration of the display device 1 will be described. The monitor unit 112 of the display 11 in the display device 1 is a display such as a liquid crystal display (LCD). The detector 12 is a sensor such as a gyro sensor as described above. The controller 13 and the display control unit 111 of the display 11 are formed with a processing circuit. In other words, the display device 1 includes a processing circuit for determining a display method in the display 11 while the train 4 remains stopped. The processing circuit may be formed with a processor that executes a program stored in a memory, and the memory, or may be formed with dedicated hardware.

Figure 7:
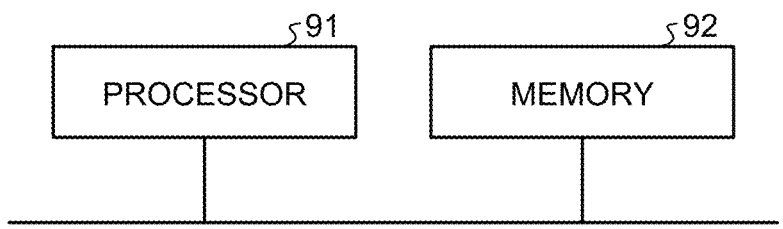
FIG. 7 is a diagram illustrating an example case where a processing circuit included in the display device according to the first embodiment is formed with a processor and a memory.

FIG. 7 is a diagram illustrating an example case where the processing circuit included in the display device 1 according to the first embodiment is formed with a processor and a memory. In a case where the processing circuit is formed with a processor 91 and a memory 92, each of the functions of the processing circuit of the display device 1 are achieved with software, firmware, or a combination of software and firmware. Software or firmware is written as programs, and is stored in the memory 92. In the processing circuit, the processor 91 reads and executes the programs stored in the memory 92, to achieve each of the functions. In other words, the processing circuit includes the memory 92 for storing a program to be executed as a result of determining the display method at the display 11 while the train 4 is being stopped. These programs can also be regarded as programs for causing a computer to carry out the procedures and the method of the display device 1.

Here, the processor 91 may be a central processing unit (CPU), a processing device, an arithmetic device, a microprocessor, a microcomputer, a digital signal processor (DSP), or the like. The memory 92 may be a nonvolatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disc, a mini disc, a digital versatile disc (DVD), or the like, for example.

Figure 8:
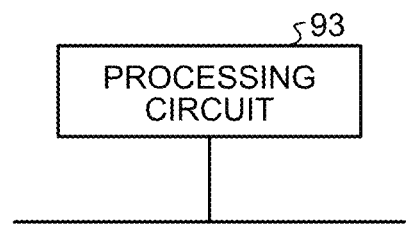
FIG. 8 is a diagram illustrating an example case where the processing circuit included in the display device according to the first embodiment is formed with dedicated hardware.

FIG. 8 is a diagram illustrating an example case where the processing circuit included in the display device 1 according to the first embodiment is formed with dedicated hardware. In a case where the processing circuit is formed with dedicated hardware, a processing circuit 93 illustrated in FIG. 8 may be a single circuit, a composite circuit, a programmed processor, a parallel-programmed processor, an application specific integrated circuit (ASIC), a field programmable gate array (FPGA), or a combination thereof, for example. Each of the functions of the display device 1 may be achieved with the processing circuit 93 independently of one another, or each of the functions may be collectively achieved with the processing circuit 93.

Note that some of the functions of the display device 1 may be achieved with dedicated hardware, and the others may be achieved with software or firmware. In this manner, a processing circuit can achieve the above described functions with dedicated hardware, software, firmware, or a combination thereof.

As described above, according to the first embodiment, in the display device 1 that can be mounted on the train 4 in the upside down direction, the controller 13 determines to cause the display 11 to display the display data in the prescribed direction in a case where the display 11 is installed with the top and the bottom thereof being oriented in the prescribed direction, and determines to cause the display 11 to display the display data in the upside-down direction in a case where the display 11 is installed in the upside-down direction, while the train 4 remains stopped. Further, in a case where the train 4 is running, the controller 13 does not determine a display method of the display data in the display 11. In this manner, the display device 1 mounted on the train 4 can reduce erroneous determination in determining the orientation of display of the display data.

Second Embodiment

In the first embodiment, the display device 1 determines a display method once after activation of the display device 1, and maintains the determined display method until the train 4 is activated next time. A second embodiment concerns a case where the display device 1 repeatedly determines a display method while the train 4 is operating.

Figure 9:
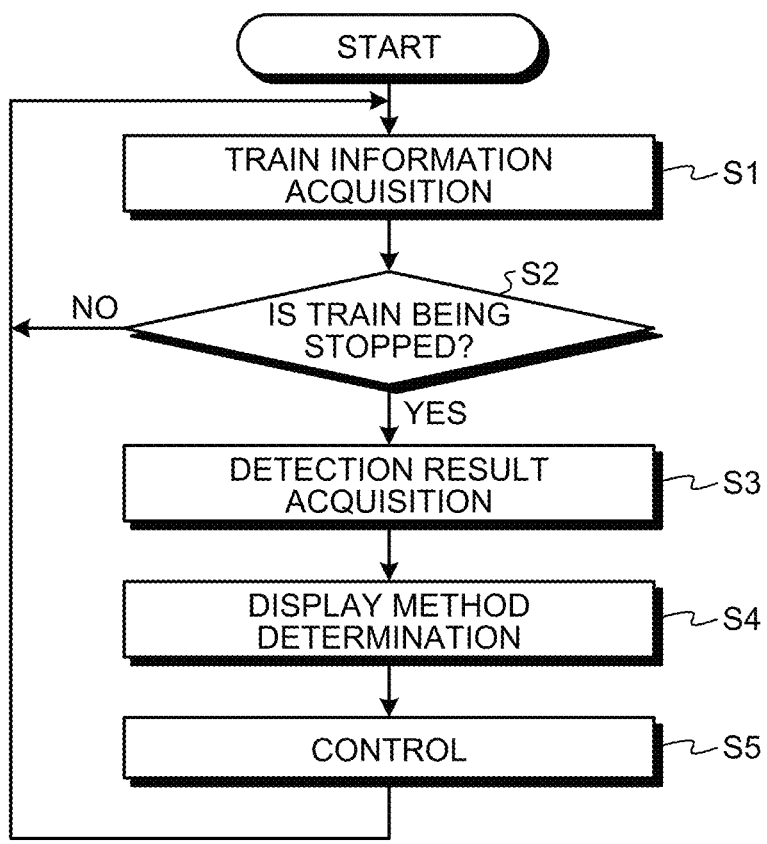
FIG. 9 is a flowchart illustrating an operation for determining a display method in a display device according to a second embodiment.

The configuration of the display device 1 in the second embodiment is the same as the configuration of that of the first embodiment illustrated in FIG. 5. FIG. 9 is a flowchart illustrating an operation for determining a display method in the display device 1 according to the second embodiment. In the flowchart in FIG. 9, the difference from the flowchart of the first embodiment illustrated in FIG. 6 is that the display device 1 returns to step S1 after step S5 and repeatedly performs the operation illustrated in the flowchart. The controller 13 determines a display method of the display data in the display 11 every time the train 4 stops. For example, every time the train 4 stops at a station, the controller 13 determines a display method of the display data in the display 11. While the train 4 remains stopped, the controller 13 may determine a display method of the display data in the display 11 a plurality of times. Further, in a case where the controller 13 determines that the train 4 has stopped, the controller 13 determines a display method of the display data in the display 11 once. After that, in a case where the controller 13 determines that the train 4 has stopped after detecting that train 4 was not stopped or the train 4 was running, the controller 13 may determine a display method of the display data in the display 11 once.

In the first embodiment, the display device 1 determines a display method only once after activation of the display device 1. However, in a case where the installation state of the display 11 is wrongly determined due to some problem in determining a display method, the display device 1 cannot correct the display method while the train 4 is operating, and continues to display the display data in a wrong manner or in the upside-down direction until the next activation. In the second embodiment, the display device 1 repeatedly determines a display method. Even in a case where a display method has not been correctly determined for the display 11 due to erroneous determination made by the detector 12, the display device 1 can perform an operation for determining a display method when the train 4 stops, and correct the display method in the display 11.

As described above, according to the second embodiment, the display device 1 performs an operation for determining a display method every time the train 4 stops. Accordingly, even in a case where the display device 1 did not correctly determine a display method due to erroneous determination made by the detector 12, the display device 1 can correct the display method when the train 4 stops.

The configuration described in the above embodiment is an example of the subject matter of the present invention, and may be combined with other known techniques, or may be partially omitted or modified without departing from the scope of the present invention.

REFERENCE SIGNS LIST 1, 1-1 to 1-12 display device; 2-1 to 2-6 door; 3-1 to 3-6 car; 4 train; 6-1, 6-2, 56 connector; 7-1, 7-2 cable; 8 terminal device; 9 control network line; 11 display; 12 detector; 13 controller; 50 recess; 51 to 55 face; 111 display control unit; 112 monitor unit.

The invention claimed is:

1. A display device mounted on a train, the display device comprising:
    a display configured to display data by a plurality of display methods with different orientations;
    a detector configured to detect an installation state of the display; and
    a control circuitry configured to
        acquire train information from which it is possible to determine whether the train is currently stopped, and determine whether the train is currently stopped on a basis of the acquired train information,
    wherein (i) when the train is currently stopped, the control circuitry determines a display method for the display data in the display on a basis of the detected installation state of the display, and (ii) when the train is not currently stopped, the control circuitry does not determine the display method in the display, and
    wherein when the control circuitry determines that the train is currently stopped, and the detected installation state indicates that the display is installed with a top and a bottom of the display being oriented in a prescribed direction, the control circuitry determines the display method for causing the display to display the display data in the prescribed direction, and when the detected installation state indicates that the display is installed upside down with respect to the prescribed direction, the control circuitry determines the display method for causing the display to display the display data upside down with respect to the prescribed direction.

2. The display device according to claim 1, wherein the control circuitry determines the display method in the display once after activation of the display device.

3. The display device according to claim 1, wherein the control circuitry determines the display method in the display every time the train stops.

4. The display device according to claim 1, wherein the train information includes at least one piece of open/close information about doors of the train, positional information about the train, and velocity information about the train.

5. A display control method in a display device mounted on a train, the display control method comprising:
    detecting, by a detector, an installation state of the display device that is configured to display data by a plurality of display methods with different orientations;
    acquiring, in a train information acquisition step, by a control circuitry, train information from which it is possible to determine whether the train is currently stopped; and
    determining, in a control step, by the control circuitry whether the train is currently stopped using the train information,
    wherein (i) when the train is currently stopped, the control step includes determining a display method for display data on the display device on a basis of the detected installation state of the display device, and (ii) when the train is not currently stopped, the control step includes not determining the display method in the display, and
    wherein in the control step, when the control circuitry determines that the train is currently stopped, and the detected installation state indicates that the display is installed with a top and a bottom of the display being oriented in a prescribed direction, the control circuitry determines the display method for causing the display to display the display data in the prescribed direction, and when the detected installation state indicates that the display is installed upside down with respect to the prescribed direction, the control circuitry determines the display method for causing the display to display the display data upside down with respect to the prescribed direction.

6. The display control method according to claim 5, wherein
    in the control step, the control circuitry determines the display method in the display once after activation of the display device.

7. The display control method according to claim 5, wherein
    in the control step, the control circuitry determines the display method in the display every time the train stops.

8. The display control method according to claim 5, wherein
    the train information includes at least one piece of open/close information about doors of the train, positional information about the train, and velocity information about the train.

* * * * *